(12) United States Patent
Amidon et al.

(10) Patent No.: US 9,014,832 B2
(45) Date of Patent: Apr. 21, 2015

(54) AUGMENTING MEDIA CONTENT IN A MEDIA SHARING GROUP

(75) Inventors: Christopher M. Amidon, Apex, NC (US); Eugene M. Farrelly, Cary, NC (US)

(73) Assignee: Eloy Technology, LLC, Wilmington, DE (US)

( * ) Notice: Subject to any disclaimer, the term of this patent is extended or adjusted under 35 U.S.C. 154(b) by 963 days.

(21) Appl. No.: 12/569,766

(22) Filed: Sep. 29, 2009

(65) Prior Publication Data

US 2012/0116558 A1  May 10, 2012

Related U.S. Application Data

(60) Provisional application No. 61/149,202, filed on Feb. 2, 2009.

(51) Int. Cl.
*G06F 17/00* (2006.01)
*H04L 12/28* (2006.01)

(52) U.S. Cl.
CPC .................................. *H04L 12/2809* (2013.01)

(58) Field of Classification Search
CPC .................... G06F 17/30017; G06F 17/30883; G11B 27/031; G10H 2240/155; H04L 65/4084; H04L 65/60; H04H 60/27; H04N 21/4334
USPC .................... 700/94; 455/3.06; 704/500–504; 369/1–12
See application file for complete search history.

(56) References Cited

U.S. PATENT DOCUMENTS

| | | | |
|---|---|---|---|
| 5,610,665 A | 3/1997 | Berman | |
| 5,708,845 A | 1/1998 | Wistendahl et al. | |
| 5,818,440 A | 10/1998 | Allibhoy et al. | |
| 5,818,512 A | 10/1998 | Fuller | |
| 5,929,850 A | 7/1999 | Broadwin et al. | |
| 6,064,379 A | 5/2000 | DeMoney | |
| 6,240,555 B1 | 5/2001 | Shoff et al. | |
| 6,477,579 B1 | 11/2002 | Kunkel et al. | |
| 6,813,039 B1 | 11/2004 | Silverbrook et al. | |
| 6,986,018 B2 | 1/2006 | O'Rourke et al. | |
| 7,191,193 B2 * | 3/2007 | Ben-Yaacov et al. | ........... 360/32 |
| 7,237,253 B1 | 6/2007 | Blackketter et al. | |
| 7,490,346 B2 | 2/2009 | Alao et al. | |

(Continued)

FOREIGN PATENT DOCUMENTS

EP   1045587 A1   10/2000
KR   20020073646 A   9/2002

(Continued)

OTHER PUBLICATIONS

Abstract, Korean Patent Publication 20020073646(A), published Sep. 28, 2002, "Method for Transmitting Data Through Control Operation Between Mutual Devices," Korean Patent Application No. 20010013367, filed Mar. 15, 2001, Applicant/Inventor: Kim Young Eyn, obtained from http://www.espacenet.com, 1 page.

(Continued)

*Primary Examiner* — Andrew C Flanders

(57) ABSTRACT

Augmentation of media content in a media sharing group is provided for a plurality of devices by receiving an identification of an Internet radio station; establishing communication with the Internet radio station; ripping radio content received from the Internet radio station into storage as a digital file; and adding the ripped radio content to an aggregate media collection of the media sharing group.

12 Claims, 4 Drawing Sheets

(56) References Cited

U.S. PATENT DOCUMENTS

| | | |
|---|---|---|
| 7,594,245 B2 | 9/2009 | Sezan et al. |
| 7,631,338 B2 | 12/2009 | Del Sesto et al. |
| 7,698,727 B2 | 4/2010 | Kikinis et al. |
| 7,810,126 B2 | 10/2010 | Newton et al. |
| 7,987,280 B1* | 7/2011 | Putnam et al. .............. 709/231 |
| 2002/0073423 A1 | 6/2002 | Krakirian |
| 2002/0083201 A1 | 6/2002 | Iyengar et al. |
| 2002/0169885 A1 | 11/2002 | Alao et al. |
| 2003/0018971 A1 | 1/2003 | McKenna |
| 2003/0229900 A1 | 12/2003 | Reisman |
| 2004/0177199 A1 | 9/2004 | Yang |
| 2005/0091275 A1* | 4/2005 | Burges et al. .............. 707/104.1 |
| 2005/0177861 A1 | 8/2005 | Ma et al. |
| 2005/0249080 A1* | 11/2005 | Foote et al. ................ 369/59.1 |
| 2006/0053090 A1 | 3/2006 | Cotter et al. |
| 2006/0206582 A1 | 9/2006 | Finn |
| 2007/0089158 A1 | 4/2007 | Clark |
| 2007/0150462 A1 | 6/2007 | Nonaka et al. |
| 2007/0162929 A1 | 7/2007 | Mickle et al. |
| 2007/0191097 A1 | 8/2007 | Johnson |
| 2007/0243936 A1 | 10/2007 | Binenstock et al. |
| 2007/0261090 A1 | 11/2007 | Miller et al. |
| 2008/0002830 A1* | 1/2008 | Cherkasov et al. .......... 380/277 |
| 2008/0250452 A1 | 10/2008 | Iwamoto |
| 2009/0164514 A1* | 6/2009 | Svendsen et al. .......... 707/104.1 |
| 2009/0265426 A1 | 10/2009 | Svendsen et al. |
| 2010/0030578 A1 | 2/2010 | Siddique et al. |
| 2010/0070898 A1 | 3/2010 | Langlois et al. |
| 2010/0153530 A1 | 6/2010 | Erickson et al. |
| 2010/0153997 A1 | 6/2010 | Baumgartner et al. |
| 2010/0153999 A1 | 6/2010 | Yates |
| 2010/0186034 A1 | 7/2010 | Walker |
| 2011/0218657 A1* | 9/2011 | Kalis .............................. 700/94 |

FOREIGN PATENT DOCUMENTS

| | | |
|---|---|---|
| WO | 01/90950 A1 | 11/2001 |
| WO | 2007/112119 A2 | 10/2007 |
| WO | 2009/105465 A2 | 8/2009 |
| WO | 2009/140386 A1 | 11/2009 |

OTHER PUBLICATIONS

"Augmented reality," originally found at <http://en.wikipedia.org/wiki/Augmented_reality>, archived copy found at the Internet Archive dated Dec. 20, 2008, known about since at least Jun. 22, 2008, page last modified on Dec. 18, 2008, printed Apr. 27, 2011, 9 pages.

"CES Intel Keynote mobile device demo," video from Consumer Electronics Show (CES) 2008, Jan. 7-10, 2008, Las Vegas, Nevada, video located at <http://www.youtube.com/watch?v=tAkXQUaawLg>, posted Jan. 8, 2008, printed Apr. 21, 2011, 2 pages.

Lu, K.Y., "Interaction Design Principles for Interactive Television," Masters Thesis, Georgia Institute of Technology, May 2005, found at <http://lcc.gatech.edu/ms_projects/klu/lu_karyn_y_200505_mast.pdf>, 219 pages.

Pemberton, L. and Fallahkhair, S., "Design Issues for Dual Device Learning: interactive television and mobile phone," In Proceedings of MLEARN 2005, Oct. 25-28, 2005, Cape Town, South Africa, found at <http://www.mlearn.org.za/CD/papers/Pemberton&Fallahkhair.pdf>, 7 pages.

* cited by examiner

AUGMENTING MEDIA CONTENT IN A MEDIA SHARING GROUP

CROSS-REFERENCE TO RELATED APPLICATIONS

This application claims the benefit of provisional Patent Application Ser. No. 61/149,202, filed Feb. 2, 2009, assigned to the assignee of the present application, and incorporated herein by reference.

BACKGROUND

Products, such as iTunes©, exist that allow a group of users on the same local area network LAN to share their digital music collections thereby giving each member of the group access to songs that are not necessarily on their local machine. In many of these products, like iTunes©, a user can access the collection of only one other user on the LAN at a time. The user cannot aggregate the collections of all users on the LAN. Further, the shared individual collections do not maintain any of the organizational structure (i.e., playlists) created by the original owner of the collection. Even if the collections of the users were aggregated, unless a user works in an environment where the user base is constantly changing or users are consistently adding new music, the content available from the aggregated collection would likely become stale.

BRIEF SUMMARY

The exemplary embodiments provide methods and systems for augmenting media content in a media sharing group comprising a plurality of devices. Aspects of the exemplary embodiments include receiving an identification of an Internet radio station; establishing communication with the Internet radio station; ripping radio content received from the Internet radio station into storage as a digital file; and adding the ripped radio content to an aggregate media collection of the media sharing group.

According to the method and system disclosed herein, the exemplary embodiment leverages Internet radio to automatically and continually add new content to the media sharing group with minimal user involvement.

DETAILED DESCRIPTION

The exemplary embodiment relates to augmenting media in a media sharing group. The following description is presented to enable one of ordinary skill in the art to make and use the invention and is provided in the context of a patent application and its requirements. Various modifications to the exemplary embodiments and the generic principles and features described herein will be readily apparent. The exemplary embodiments are mainly described in terms of particular methods and systems provided in particular implementations. However, the methods and systems will operate effectively in other implementations and the systems, devices, and networks usable with the present invention can take a number of different forms. For example, although preferred embodiments may refer to the term media with reference to music, songs or tracks, the term media may also apply to digital documents, images, slideshows, video and/or any other type of digital file or component. Phrases such as "exemplary embodiment", "one embodiment" and "another embodiment" may refer to the same or different embodiments. The embodiments will be described with respect to systems and/or devices having certain components. However, the systems and/or devices may include more or less components than those shown, and variations in the arrangement and type of the components may be made without departing from the scope of the invention. The exemplary embodiments will also be described in the context of particular methods having certain steps. However, the method and system operate effectively for other methods having different and/or additional steps and steps in different orders that are not inconsistent with the exemplary embodiments. Thus, the present invention is not intended to be limited to the embodiments shown, but is to be accorded the widest scope consistent with the principles and features described herein.

The exemplary embodiments provide methods and systems for augmenting media in a media sharing group through automatic integration of Internet radio. The system provides a radio device as a member of a media sharing group in a network environment that continuously adds content to its local media collection by ripping said content from identified Internet radio streams. The system provides each member of the media sharing group access to the new content of the radio device after ripping and storing the songs as they are played in real-time by the Internet radio station, thereby providing a solution to stale content in a shared music environment.

Figure 1:
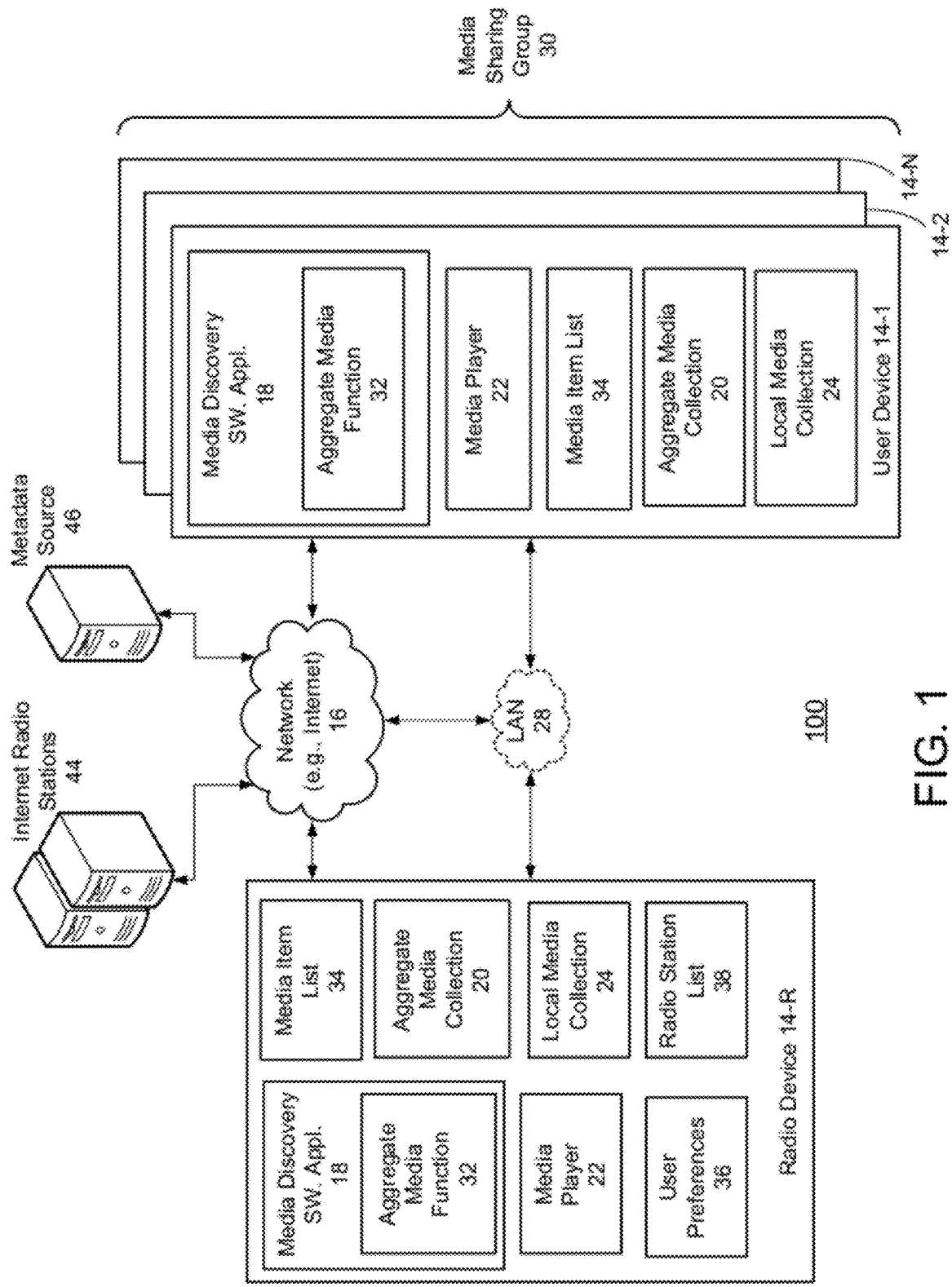
FIG. 1 is a diagram illustrating one embodiment of a media sharing system.

FIG. 1 is a diagram illustrating one embodiment of a media sharing system. The media sharing system 100 is implemented as a network comprising a number of user devices 14-1 through 14-N (collectively herein the user devices 14-U) in a media sharing group 30. One of the user devices 14-U may be designated as a radio device 14-R. The user devices 14-U and radio device 14-R are collectively herein referred to as devices 14. In one embodiment, the radio device 14-R may be considered part of the media sharing group 30. In another embodiment, the functionality of the radio device 14-R may be incorporated in each of the user devices 14-U of the media sharing group 30. In yet another embodiment, any number of the user devices 14-U may be configured as the radio device 14-R. Like components common to the user devices 14-U and the radio device 14-R are referred to with like reference numerals.

The devices 14 may each include a media player 22 and a local media collection 24 and are capable of presenting or playing media items, which may include, but not necessarily limited to, digital songs (e.g., MP3s), video presentations, and slideshows from their respective local media collections 24. The media player 22 may be implemented as a browser, an applet, an application, and the like. The local media collection 24 may include any number of media files stored in one or more digital storage devices such as, for example, a hard-disc/optical drive, a Random-Access Memory (RAM), a Flash memory, an external digital storage device, and the like. The devices 14 may be portable devices such as, portable audio players, mobile telephones, Personal Digital Assistants (PDAs), and the like, having audio playback capabilities.

However, the user devices 14-U may alternatively be stationary devices such as personal computers, set-top boxes, game systems, and the like.

In one embodiment, the user devices 14-U may be configured to communicate with the radio device 14-R over the network 16. The network 16 may be a public network, such as the Internet, or a private network, such as an intranet, WLAN, or WiMAX, or a combination thereof. In one embodiment, the user devices 14-U may be optionally connected to a local area network (LAN) 28 and be part of a sub-network. In one embodiment, the radio device 14-R may execute a media discovery software application 18-R, and the user devices 14-U may execute a media discovery software application 18. The media discovery software applications 18 and 18-R may receive the identities of the devices 14 in the media sharing group 30 belonging to other users or friends on the network 16 or LAN 28 that have been configured to share their respective local media collections 24, and may aggregate their respective local media collections 24 into one aggregate media collection 20. As used herein, the devices 14 of users who have chosen to share their local media collections 24 are referred to as a media sharing group 30. In an alternative embodiment, the user devices 14-U may be configured to communicate directly with one another as well as with the radio device 14-R to form a peer-to-peer network.

In one embodiment, the media discovery software applications 18 and 18-R may include a software component called an aggregate media function 32 for aggregating the local media collections 24. The devices 14 may maintain a list of media items, including music and video files, stored in the aggregate media collection in a media item list 34. The aggregate media collection 20 may include any number of media items stored in one or more digital storage devices accessible by the devices 14 such as, for example, hard-disc/optical drives, Random-Access Memory (RAM), Flash memory, external digital storage devices, and the like. The aggregate media collection 20 may include copies of the actual media items from the local media collections 24, or just references thereto. In one embodiment, the aggregation function may be implemented as described in U.S. patent application Ser. No. 12/104,572 entitled "Method and System for Aggregating Media Collections Between Participants of a Sharing Network," which is incorporated herein in its entirety.

The radio device 14-R may also maintain a list of users and their corresponding user devices 14-U and preferences in a repository shown as user preferences 36. According to a further embodiment, the radio device 14-R may maintain in a radio station list 38 a record of Internet radio stations 44 available on the network 16. The media discovery software application 18-R uses the Internet radio stations 44 to augment the content of the aggregate media collection 20 by automatically ripping content from identified Internet radio streams and adding the ripped content to the local media collection 24 of the radio device 14-R. As used herein, the term ripping refers to the process of extracting songs received from a radio stream and digitally saving the songs as separate audio files or tracks, and optionally tagging the songs with metadata identifying, for example, title, author, genre, and the like. The system 100 automatically propagates the newly ripped songs through the media sharing group 30 by updating the aggregate media collection 20 on the devices 14 using the aggregate media function 32. The addition of new content into the system by the radio device 14-R provides a solution to stale content in the shared media environment.

The media player 22 may be implemented in software, hardware, or a combination of software and hardware. The devices 14 may include hardware components of typical computing devices, including a processor, input devices (e.g., keyboard, pointing device, microphone for voice commands, buttons, touchscreen, etc.), output devices (e.g., a display device). The devices 14 may include computer-readable media, e.g., memory and storage devices (e.g., flash memory, hard drive, optical disk drive, magnetic disk drive, and the like) containing computer instructions that implement the functionality disclosed when executed by the processor. The devices 14 may further include wired or wireless network communication interfaces for communication.

Figure 2:
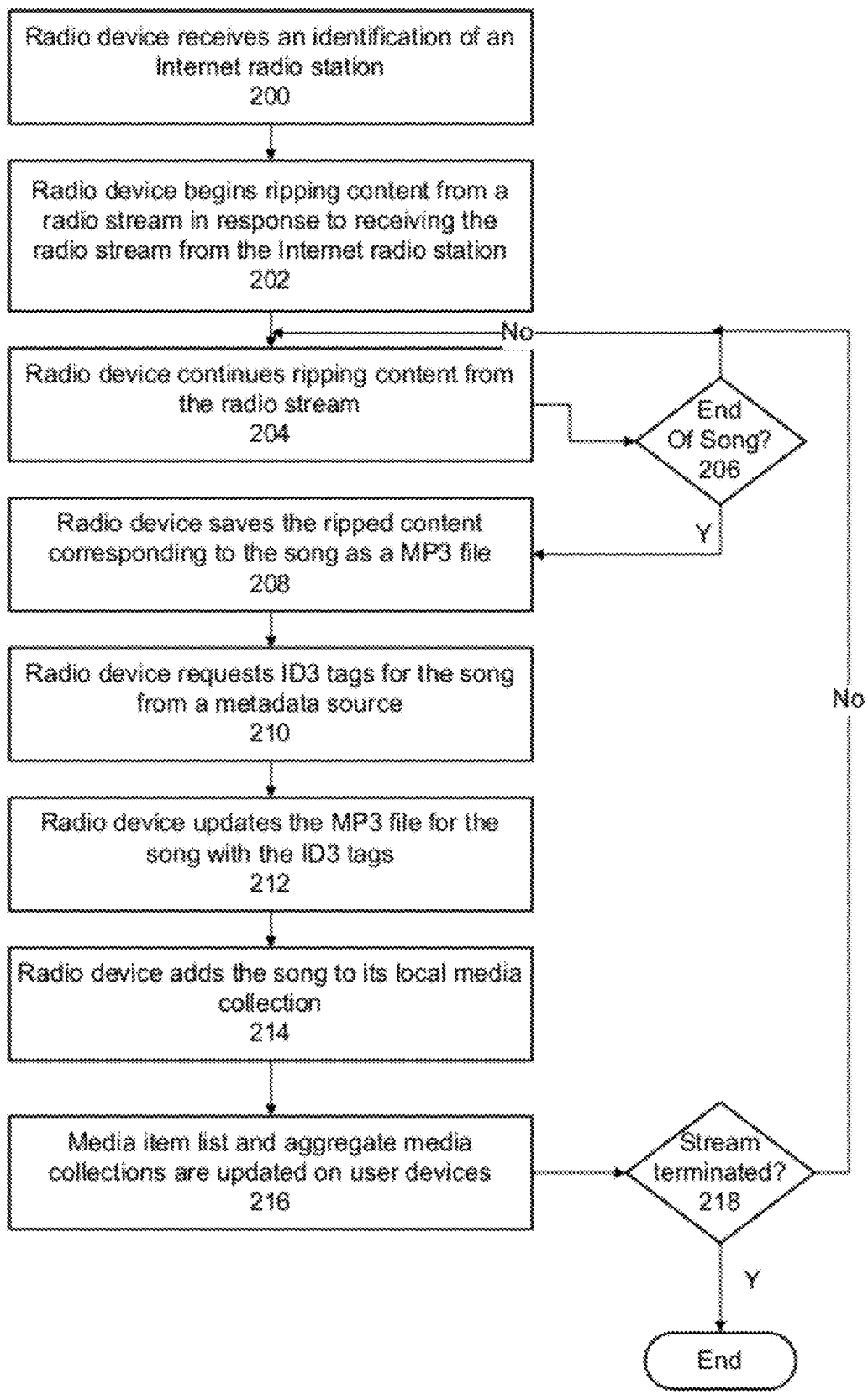
FIG. 2 is a flow diagram illustrating one exemplary process for augmenting media in a media sharing group.

Although the radio device 14-R is shown as a single computer, it should be understood that the functions of radio device 14-R may be distributed over more than one computer, and the functionality of software components may be implemented using a different number of software components. In an alternative embodiment (not shown), the radio device 14-R of FIG. 1 may be implemented as a virtual entity whose functions are distributed over multiple user devices 14-U of the media sharing group 30. In yet another embodiment, any number of the user devices 14-U may be configured as the radio device 14-R FIG. 2 is a flow diagram illustrating details of the process for augmenting media in a media sharing group in accordance with the embodiment of FIG. 1. Referring to both FIGS. 1 and 2, the process may include the radio device 14-R receiving an identification of an Internet radio station 44 (block 200). In one embodiment, the media discovery software application 18-R receives the identification. The identification may be received via manual input from users of the media sharing group 30 who indicate their selection of their favorite Internet radio stations 44 through either the media player 22 or a browser on their device 14, for example. In another embodiment, the identification of the Internet radio station 44 may be automatically determined based on the user preferences 36.

The radio device 14-R begins ripping content from a radio stream in response to receiving the radio stream from the Internet radio station 44 (block 202). The radio device 14-R continues ripping content from the radio stream (block 204). It is then determined if an end to a song has been reached (block 206). If not, the radio device 14-R continues ripping content from the radio stream (block 204).

Once it has been determined that the end to the song has been reached, the radio device 14-R may save the ripped content corresponding to the song as, for example, an MP3 file (block 208). The radio device 14-R may request ID3 tags for the song from the metadata source 46 (block 210). In response to receiving the ID3 tags, the radio device 14-R may update the MP3 file for the song with the ID3 tags (block 212). The radio device 14-R adds the ripped radio content, i.e., the song, to the local media collection 24 (block 214), and the ripped content is added to the aggregate media collections 20 once the aggregate media collections 20 and media item lists 34 for all devices 14 are updated (block 216).

In one embodiment, the media item list 34 of the radio device 14-R may act as a global master list (e.g., XML). The resulting updates may be also propagated to the user devices 14-U, thereby allowing the user devices 14-U in the media sharing group 30 to access the ripped content. The updates may be propagated to the user devices 14-U either by the radio device 14-R pushing the updates in the media item list 34 to the devices 14, or by the devices 14 polling the radio device 14-R regularly for the updates.

Until the radio stream is terminated (block 218), either by the user or by the Internet radio station 44, the radio device 14-R continues ripping content from the radio station (block 204).

In one embodiment, the radio device 14-R may manage a buffer of ripped tracks by continually filtering, prioritizing and pruning the buffer based on the user preferences 36.

The following is an example user case illustrating the process of adding content to a media sharing group in the embodiments of FIGS. 1 and 2. The example assumes that members of the media sharing group 30 can identify favorite Internet radio stations 44 to the radio device 14-R and that those favorite Internet radio stations 44 are available whenever they log in to the media sharing group 30.

In this example, assume User A wants to augment content available to him from the media sharing group 30, and adds "Club 977 The 80's Channel" as one of his favorite radio stations. The radio device 14-R connects to the radio station stream from Club 977 The 80's Channel and rips the music into MP3 files. The radio device 14-R updates the tags of the MP3 files the radio device 14-R has ripped using the metadata sent in the radio station stream and/or by using fingerprinting technology (like Shazam™) and a metadata source 46 (like Gracenote™). The radio device 14-R updates the media item list 34 (XML file) with the tags of the newly ripped content. The radio device 14-R propagates the changes to the media item list 34 to the group. A push or pull mechanism could be employed here, i.e., User A's user device 14-1 polls the radio device 14-R for any updates or the radio device 14-R automatically pushes the updates to User A's user device 14-1. User A accesses the newly ripped content from the radio device 14-R. In one embodiment, the actual MP3 files may be stored in the aggregate media collection 20, while in another embodiment, only references to the ripped songs are stored.

After ripped songs are added to the aggregate media collection 20, users participating in the shared media group 30 will have access to the songs.

Figure 3:
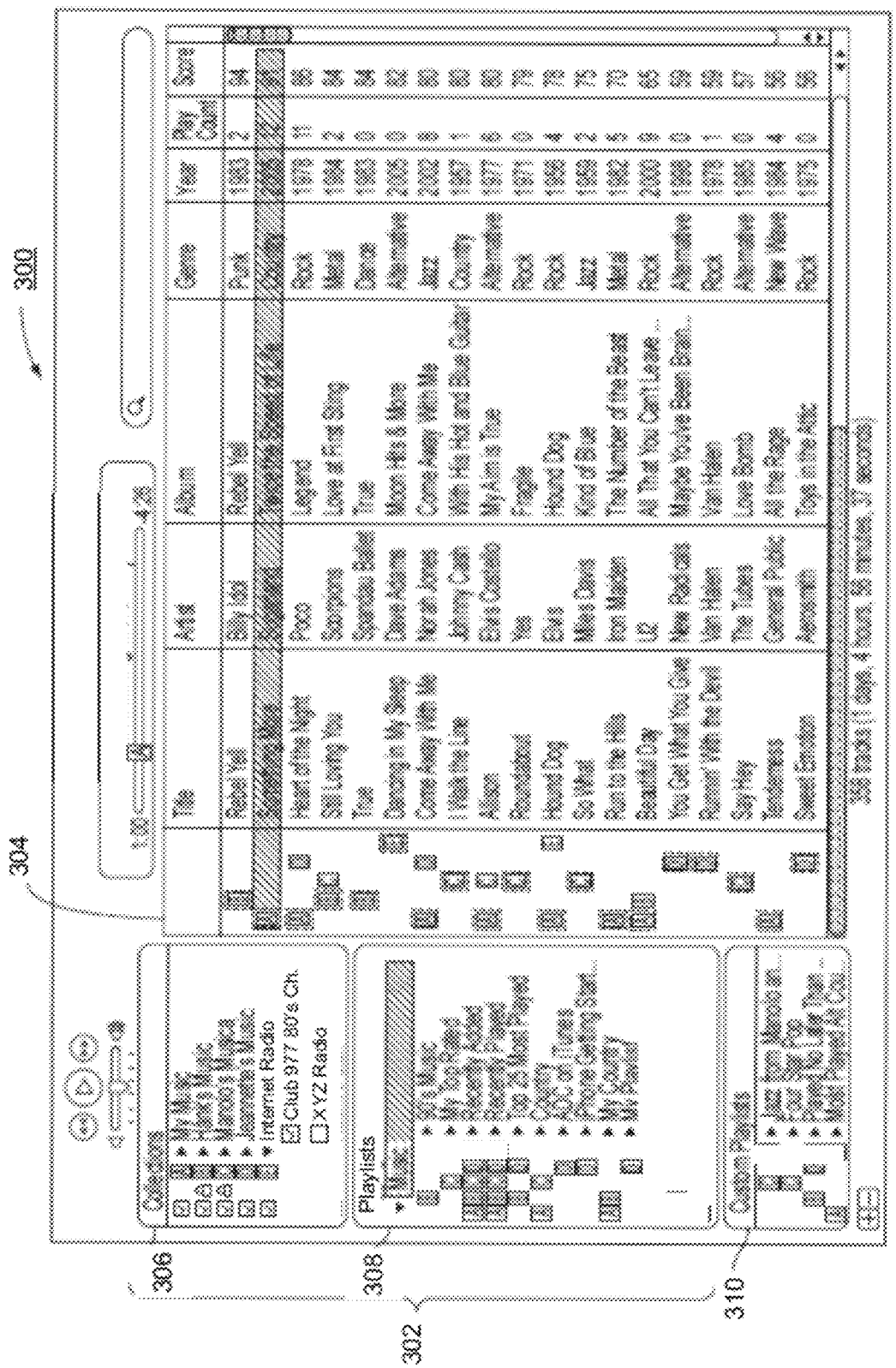
FIG. 3 is a diagram illustrating an exemplary graphical user interface (GUI) showing a media aggregation window displaying contents of the aggregate media collection.

FIG. 3 is diagram illustrating an exemplary graphical user interface (GUI) 300 showing a media aggregation window displaying contents of the aggregate media collection 20. In one embodiment the GUI 300 may be displayed by the media player 22 or by the radio device 14-R via a browser.

As shown in FIG. 3, the GUI 300 may include a navigation area 302 and a display area 304. The navigation area 302 generally enables the user, which in this example may be the user of user device 14-1, to select media collections to be aggregated, as well as to navigate the aggregate media collection 20 (FIG. 1).

The navigation area 302 may include a media collection selection area 306 and a playlist selection area 308. Media collection selection area 306 may be used to present a list of media collections available to the user and to enable the user to select two or more of the media collections for aggregation. In this example, the list of media collections available to the user includes the local media collection 24 of the user, which has the title "My Music," and five shared local media collections having the titles "Hank's Music," "Manolo's Musica," "Jeanette's Music," and "Internet Radio." In this example, the user has chosen via check boxes to aggregate his local media collection 24 having the title "My Music" and the shared media collections having the titles "Hank's Music," "Manolo's Musica," "Jeanette's Music," and "Internet Radio."

The shared media collection "Internet Radio" includes two stations called "Club 977 80s Ch." and "XYZ Radio". The radio device 14-R has been ripping songs from these stations and informing the user devices 14-U about new songs added to the aggregate media collection 20.

According to one embodiment, each of the shared local media collections selected for aggregation is assigned a unique source identifier. In this example the source identifiers are alphanumeric letters (A, B, C, etc.), but is not limited thereto. Any type of indicator enabling the user to visually distinguish sources of items in the aggregate media collection 20 may be used, such as unique colors, icons or graphics, for example. In the example shown, the user has selected all available media collections, resulting in songs from each of the media collections being presented in the display area 304.

Each song displayed in the display area 304 may indicate the source identifier associated with the song. For example, two songs in the display area 304 are associated with source identifier "E", which indicates to the user that these two songs were ripped from Internet radio stations 44. In this particular example, no other user's local media collection 24 contained these two songs (as indicated by the absence of other source identifiers). Thus, the radio device 14-R has effectively augmented the aggregate media collection 20 of the media sharing group 30.

In a further embodiment, if local copies of ripped songs exist in the system 100, then the inferior copy ripped from the Internet radio station 44 could be purged (see FIG. 4) In another embodiment, to manage the number of songs in the local media collection 24 of the radio device 14-R, songs could be purged based on user preferences 36 of the users in the media sharing group 30, where tracks having low preference from all users would be purged. Alternatively, the ripped songs could be purged based on a time schedule.

Figure 4:
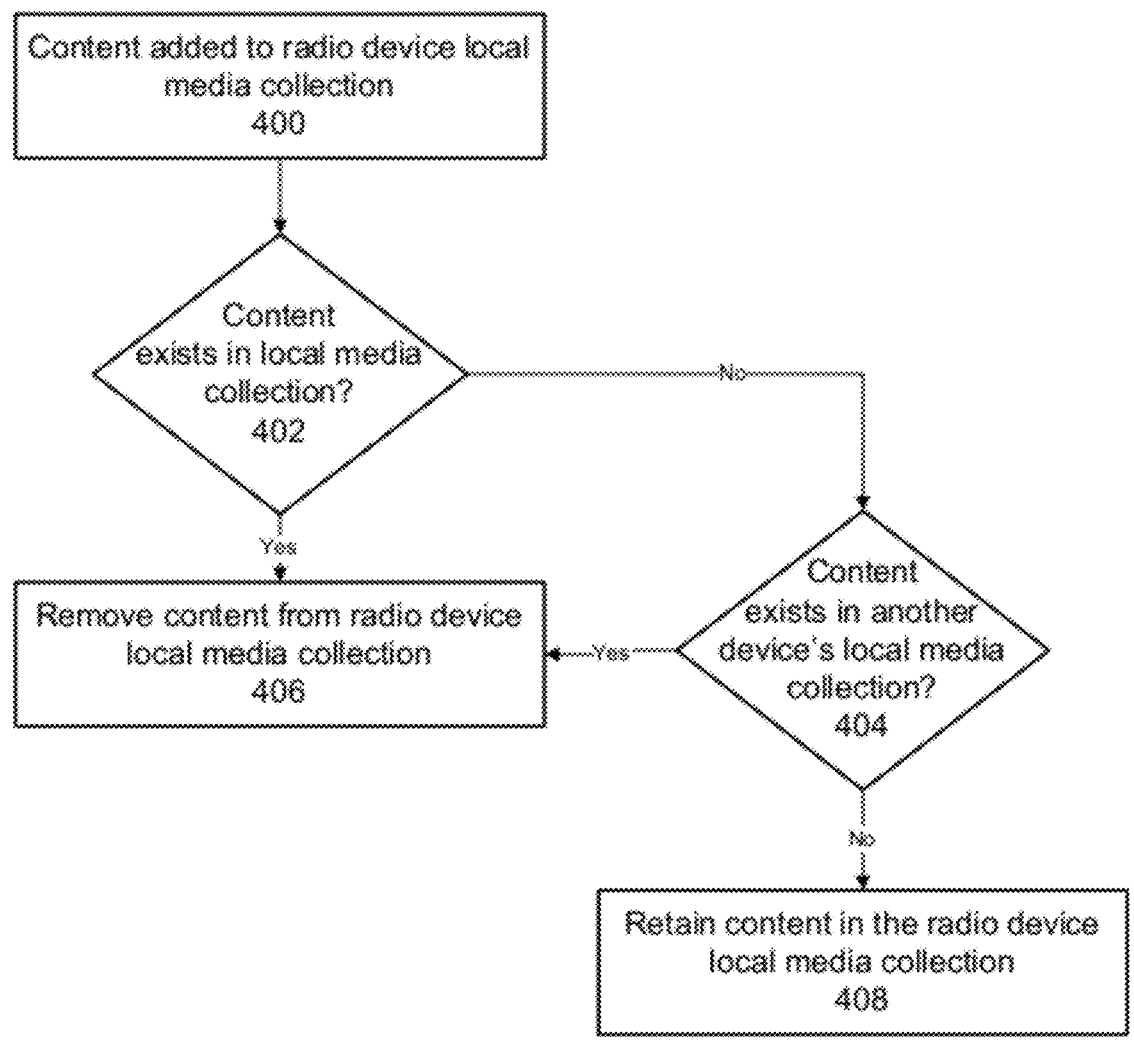
FIG. 4 is a diagram illustrating a process for optimizing access to the aggregate media collection in response to receiving a recommendation for a track.

FIG. 4 is a diagram illustrating a process for optimizing content in the local media collection 24 of the radio device 14-R. The process may begin with the addition of content to the local media collection 24 of the radio device 14-R (block 400). The radio device 14-R then determines if a local copy of the track already exists in its local media collection 24 (block 402).

If it is determined that the track is not found in the local media collection 24, the radio device 14-R determines whether the track exists in the local media collection 24 of one of the user devices 14-U (block 404).

If the track is found in the local media collection 24 of one of the user devices 14-U, the radio device 14-R removes the track from its local media collection 24 (block 406). Otherwise, the content is retained (block 408).

A method and system for augmenting media content in a media sharing group has been disclosed. The present invention has been described in accordance with the embodiments shown, and there could be variations to the embodiments, and any variations would be within the spirit and scope of the present invention. For example, the exemplary embodiment can be implemented using hardware, software, a computer readable medium containing program instructions, or a combination thereof. Software written according to the present invention is to be either stored in some form of computer-readable medium such as a memory, a hard disk, or a CD/DVD-ROM and is to be executed by a processor. Accordingly, many modifications may be made by one of ordinary skill in the art without departing from the spirit and scope of the appended claims.

We claim:

1. A computer-implemented method for augmenting media content in a media sharing group comprising a plurality of user devices, the method comprising:

receiving an identification of an Internet radio station;

establishing communication with the Internet radio station;

ripping radio content received from the Internet radio station into storage as a digital file;

adding the ripped radio content to an aggregate media collection of the media sharing group;

determining that the ripped content stored in the digital file already exists in the aggregate media collection of the media sharing group;

in response to determining that the ripped content stored in the digital file already exists in the aggregate media collection of the media sharing group, purging the digital file based on user preferences; and aggregating pre-existing local media collections of identified user devices into the aggregate media collection.

2. The method of claim 1 further comprising receiving the identification of the Internet radio station from a user.

3. The method of claim 1 further comprising receiving the identification of the Internet radio station by automatically selecting the Internet radio station based on user preferences.

4. The method of claim 1 further comprising saving the ripped radio content as individual music files and automatically updating metadata of the music files.

5. An executable software product stored on a non-transitory computer-readable medium containing program instructions for augmenting media content in a media sharing group comprising a plurality of user devices, the program instructions for:

receiving an identification of an Internet radio station;

establishing communication with the Internet radio station;

ripping radio content received from the Internet radio station into storage as a digital file;

adding the ripped radio content to an aggregate media collection of the media sharing group;

determining that the ripped content stored in the digital file already exists in the aggregate media collection of the media sharing group;

in response to determining that the ripped content stored in the digital file already exists in the aggregate media collection of the media sharing group, purging the digital file based on user preferences; and aggregating pre-existing local media collections of identified user devices into the aggregate media collection.

6. The executable software product of claim 5 further including program instructions for receiving the identification of the Internet radio station from a user.

7. The executable software product of claim 5 further including program instructions for receiving the identification of the Internet radio station by automatically selecting the Internet radio station based on user preferences.

8. The executable software product of claim 5 further including program instructions for saving the ripped radio content as individual music files and automatically updating metadata of the music files.

9. A system, comprising:

a first user device and a plurality of other user devices of a media sharing group, each including a local media collection;

a radio device coupled to the first user device and the plurality of other user devices via a network, the radio device configured by an executing software component to:

receive an identification of an Internet radio station;

establish communication with the Internet radio station;

rip radio content received from the Internet radio station into storage as a digital file;

determine that the ripped content stored in the digital file already exists in the aggregate media collection of the media sharing group;

in response to determining that the ripped content stored in the digital file already exists in the aggregate media collection of the media sharing group, purge the digital file based on user preferences; and add the ripped radio content to an aggregate media collection of the media sharing group; and wherein the radio device further includes a media discovery software application for receiving from the first user device an identity of the Internet radio station, and receiving identities of the plurality of other user devices and aggregating their respective pre-existing local media collections into the aggregate media collection.

10. A device, comprising:

a storage device;

a network interface for receiving data from a first user device of a media sharing group over a network;

a processor configured by an executing software component to:

receive an identification of an Internet radio station;

establish communication with the Internet radio station;

rip radio content received from the Internet radio station into storage as a digital file;

determine that the ripped content stored in the digital file already exists in the aggregate media collection of the media sharing group;

in response to determining that the ripped content stored in the digital file already exists in the aggregate media collection of the media sharing group, purge the digital file based on user preferences; and add the ripped radio content to an aggregate media collection of the media sharing group; and a media discovery software application that receives from the first user device an identity of the Internet radio station, and receives identities of other user devices of the media sharing group, and aggregates their respective pre-existing local media collections into the aggregate media collection.

11. The method of claim 1 further comprising purging the ripped radio content from the aggregate media collection based on a time schedule.

12. The method of claim 1, wherein one or more tracks of the ripped radio content having low preference across all users is purged.

* * * * *